US010203977B2

United States Patent
Tsirkin

(10) Patent No.: US 10,203,977 B2
(45) Date of Patent: Feb. 12, 2019

(54) LAZY TIMER PROGRAMMING FOR VIRTUAL MACHINES

(71) Applicant: Red Hat Israel, LTD, Raanana (IL)

(72) Inventor: Michael Tsirkin, Yokeneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 14/952,824

(22) Filed: Nov. 25, 2015

(65) Prior Publication Data

US 2017/0147377 A1 May 25, 2017

(51) Int. Cl.
*G06F 9/455* (2018.01)
*G06F 1/24* (2006.01)
*G06F 9/48* (2006.01)

(52) U.S. Cl.
CPC ............ *G06F 9/45558* (2013.01); *G06F 1/24* (2013.01); *G06F 9/45533* (2013.01); *G06F 9/48* (2013.01)

(58) Field of Classification Search
None
See application file for complete search history.

(56) References Cited

U.S. PATENT DOCUMENTS

| | | | |
|---|---|---|---|
| 7,512,826 B2 | 3/2009 | Armstrong et al. | |
| 7,840,962 B2 | 11/2010 | Neiger et al. | |
| 7,941,688 B2 | 5/2011 | Sharma et al. | |
| 8,146,078 B2 | 3/2012 | Bennett et al. | |
| 8,533,709 B2 | 9/2013 | Nicholas et al. | |
| 2006/0075402 A1* | 4/2006 | Neiger | G06F 9/45558 718/1 |
| 2010/0077394 A1* | 3/2010 | Wang | G06F 9/45533 718/1 |
| 2013/0218549 A1 | 8/2013 | Sultan et al. | |
| 2014/0156894 A1* | 6/2014 | Tsirkin | G06F 13/24 710/260 |
| 2014/0359608 A1 | 12/2014 | Tsirkin et al. | |
| 2016/0246644 A1* | 8/2016 | Canton | G06F 9/4812 |

OTHER PUBLICATIONS

"Determing and changing the rate of timer interrupts a guest operating system request (1005802)," vmware Knowledge Base, p. 1-2, http://kb.vmware.com/selfservice/microsites/search.do?language=en_US&cmd=displayKVMware KB: Determining and changing the rate of timer interrupts a guest operating system, accessed, Nov. 25, 2015.
"Timekeeping in VMware Virtual Machines," VMware vSphere 5.0, Workstation 8.0, Fusion 4.0, p. 1-32.

* cited by examiner

*Primary Examiner* — Sisley N Kim
(74) *Attorney, Agent, or Firm* — Lowenstein Sandler LLP

(57) ABSTRACT

A system and method for programming a timer in a virtualized system are disclosed. In accordance with one embodiment, a hypervisor executed by a processing device stores, in a first memory location that is readable by a virtual machine (VM), a first time that is associated with a first future interrupt. The hypervisor programs a timer to trigger at the first time, and detects a request by the VM for a second future interrupt at a second time, wherein the detecting comprises reading the second time from a second memory location that is writeable by the VM.

20 Claims, 4 Drawing Sheets

LAZY TIMER PROGRAMMING FOR VIRTUAL MACHINES

TECHNICAL FIELD

This disclosure relates to computer systems, and more particularly, to virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps, typically in a one-to-one fashion, to a device of the host machine (e.g., a network interface device, a CD-ROM drive, etc.). The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a system and methods for programming timers in virtualized systems. In accordance with one embodiment, a hypervisor executed by a processing device of a physical host machine stores, in a first memory location that is readable by a virtual machine (VM), a time t1 that is associated with a first future interrupt of the physical host machine. The hypervisor programs a timer of the physical host machine to trigger at time t1, and detects a request by the VM for a second future interrupt of the physical host machine at a second time t2, where the detecting comprises reading time t2 from a second memory location that is writeable by the VM. In one example, the hypervisor detects the request for the second future interrupt in response to an exit to the hypervisor at the first time.

An exit to the hypervisor may be triggered by the requesting VM. In particular, in one embodiment, the requesting VM reads time t1 from the first memory location and compares time t2 to time t1. If t2 is less than t1, an exit from the requesting VM to the hypervisor is triggered; otherwise (i.e., t2 is greater than or equal to t1), the requesting VM submits the interrupt request by storing time t2 in the second memory location, and no exit from the requesting VM to the hypervisor occurs. This feature, in which exits occur only when necessary to program a timer, is referred to as "lazy" programming of the timer.

In some implementations, the reading from the first memory location by the requesting VM, the comparing of time t2 to t1, and the storing into the second memory location by the requesting VM may be performed atomically (e.g., by a single compare-and-swap instruction). In some examples, the first interrupt may be requested by the same VM that requests the second interrupt, while in some other examples the VM that requests the second interrupt may be different than the VM that requested the first request.

Aspects of the present disclosure are thus capable of detecting instances in which the relative timing of a future interrupt requested by a VM and an already-scheduled interrupt render an exit to the hypervisor unnecessary. By programming the timer in a lazy fashion, such unnecessary exits to the hypervisor are avoided. Accordingly, aspects of the present disclosure can reduce overhead associated with exits to the hypervisor, thereby improving the performance of guest applications in virtualized environments.

Figure 1:
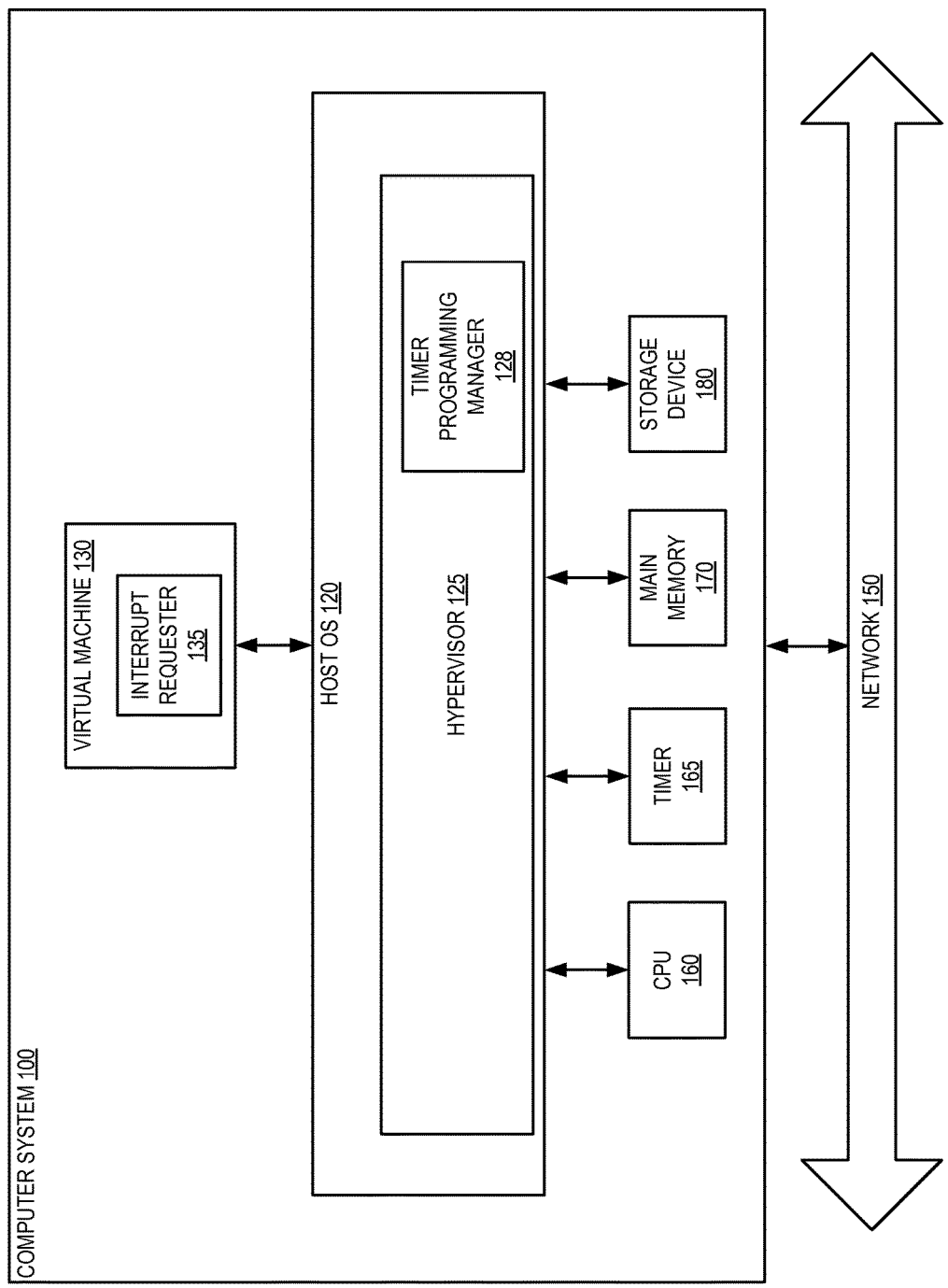
FIG. 1 depicts an illustrative computer system architecture, in accordance with an embodiment of the present disclosure.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1.

As shown in FIG. 1, the computer system 100 is connected to a network 150 and comprises central processing unit (CPU) 160, timer 165, main memory 170, which may include volatile memory devices (e.g., random access memory (RAM)), non-volatile memory devices (e.g., flash memory), and/or other types of memory devices, and storage device 180 (e.g., a magnetic hard disk, a Universal Serial Bus [USB] solid state drive, a Redundant Array of Independent Disks [RAID] system, a network attached storage [NAS] array, etc.). The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 runs a host operating system (OS) 120 that manages the hardware resources of the computer system and that provides functions such as interprocess communication, scheduling, virtual memory management, and so forth. In some examples, host operating system 120 also comprises a hypervisor 125, which provides a virtual operating platform for virtual machine 130 and that manages its execution. It should be noted that although, for simplicity, a single virtual machine is depicted in FIG. 1, in some other embodiments computer system 100 may host a plurality of virtual machines.

Virtual machine 130 is a software implementation of a machine that executes programs as though it were an actual physical machine. In some embodiments, these programs may include one or more guest applications and a guest operating system (OS) that manages resources and provides functions such as interprocess communication, scheduling, memory management, and so forth.

In some examples, virtual machine 130 may also comprise a virtual device that emulates a physical device and maps to a physical device (e.g., storage device 180, another physical device not depicted in FIG. 1, etc.). In one embodiment, hypervisor 125 manages this mapping in a transparent fashion, so that the guest OS and guest applications interact with the virtual device as though it were an actual physical device.

In accordance with one example, hypervisor 125 may include a timer programming manager 128 that is capable of programming timer 165, of detecting an interrupt request from a virtual machine, and of informing virtual machines of the time of the next scheduled interrupt, as described in more detail below with respect to FIG. 2. According to some aspects of the disclosure, the virtual machine 130 includes an interrupt requester 135 that compares the timing of its future interrupt with the timing of an interrupt scheduled by hypervisor 125 and determines whether to trigger an exit to the hypervisor, as described in more detail below with respect to FIG. 3.

It should be noted that in some other examples, hypervisor 125 may be external to host OS 120, rather than embedded within host OS 120.

Figure 2:
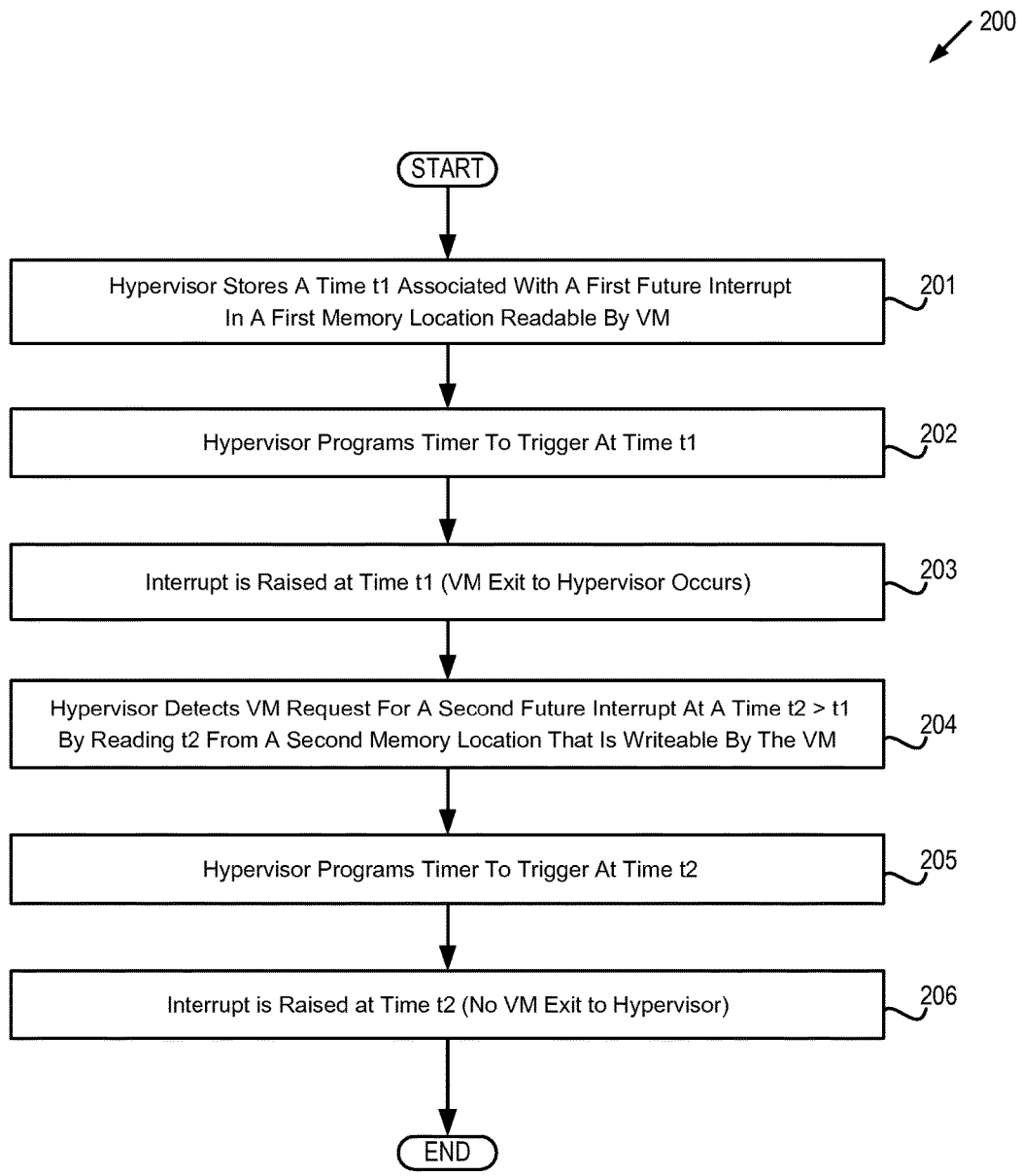
FIG. 2 depicts a flow diagram of one embodiment of a method by which a hypervisor handles interrupt requests and programs a timer.

FIG. 2 depicts a flow diagram of one embodiment of a method 200 by which a hypervisor handles interrupt requests and programs a timer. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that in some embodiments blocks depicted in FIG. 2 may be performed simultaneously or in a different order than that depicted.

At block 201, hypervisor 125 stores a time t1 associated with a first future interrupt of computer system 100 in a first memory location of memory 170 that is readable by VM 130. In examples where hypervisor manages the execution of multiple virtual machines, the first memory location may also be readable by the other virtual machines or may not be readable by the other virtual machines. It should be noted that in some examples, the first future interrupt may have been requested by VM 130, while in some other examples the first future interrupt may have been requested by some other entity (e.g., a different VM). In one implementation, block 201 is performed by timer programming manager 128.

At block 202, hypervisor 125 programs timer 165 to trigger at time t1, and at block 203, an interrupt is raised at time t1 (e.g., by CPU 160). A VM exit to the hypervisor occurs for this first interrupt (e.g., the VM triggers a VM exit if the timing of its interrupt is before t1).

At block 204, hypervisor 125 detects a request by VM 130 for a second future interrupt at a time t2, where t2>t1. In one embodiment, hypervisor 125 detects the request by reading the value of t2 from a second memory location of memory 170 that is writeable by VM 130. In examples where the hypervisor manages the execution of multiple virtual machines, the second memory location may also be writeable by the other virtual machines. In one embodiment, the detecting of the request at block 204 is performed by timer programming manager 128.

At block 205, hypervisor 125 programs timer 165 to trigger at time t2. At block 206, an interrupt is raised at time t2 (e.g., by CPU 160). No VM exit to the hypervisor occurs for this second interrupt.

It should be noted that although method 200 is depicted as a single execution, the method may be repeated each time there is another interrupt request by a virtual machine. More particularly, rather than terminating after block 206, execution will continue back at block 204 when the next interrupt request occurs—but with updated time values (e.g., t1 is set to the value t2, t2 is set to a time t3 of a third future interrupt, etc.).

Figure 3:
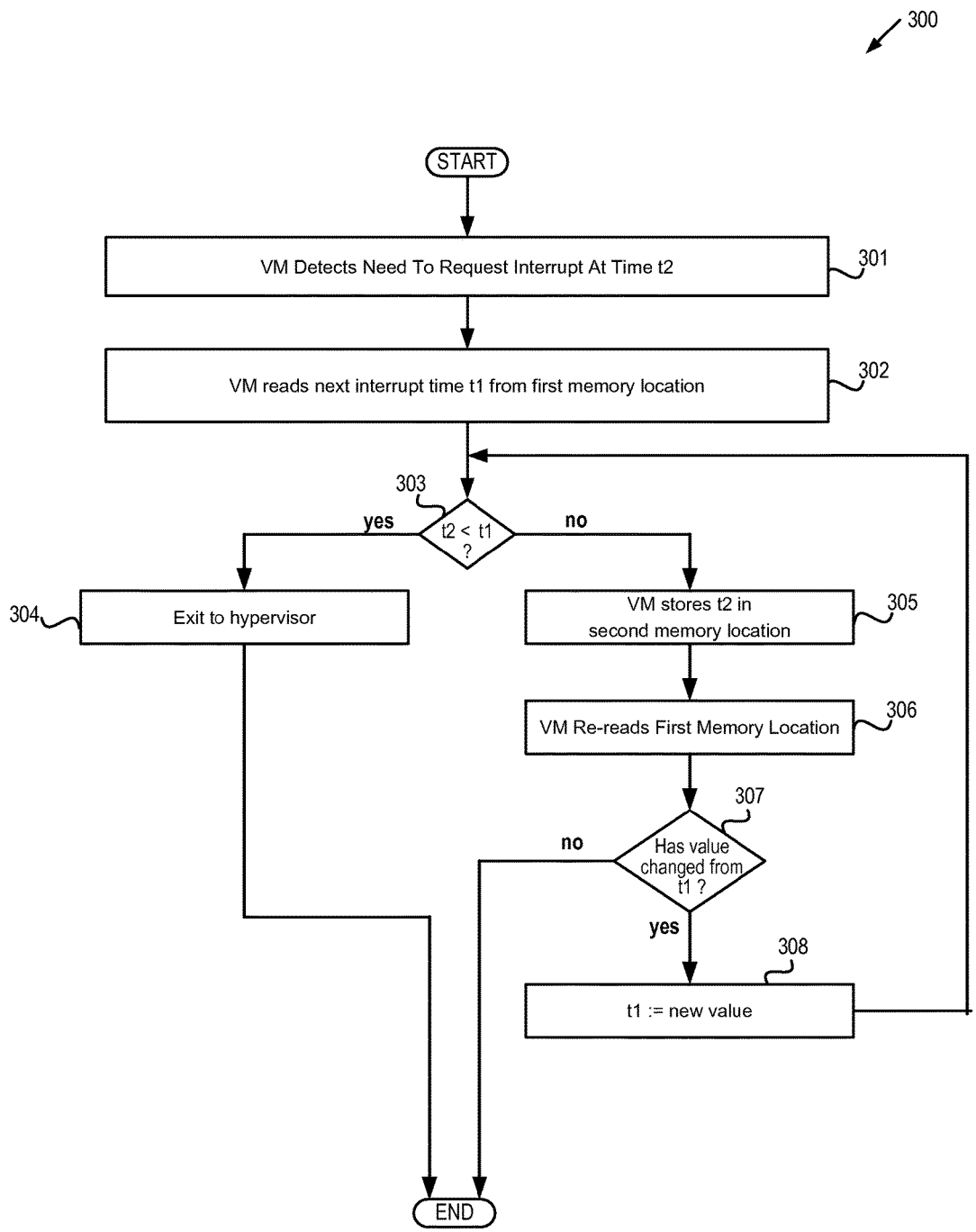
FIG. 3 depicts a flow diagram of one embodiment of a method by which a virtual machine requests an interrupt.

FIG. 3 depicts a flow diagram of one embodiment of a method 300 by which a virtual machine requests an interrupt. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that in some embodiments blocks depicted in FIG. 3 may be performed simultaneously or in a different order than that depicted.

At block 301, VM 130 detects a need to request an interrupt at a time t2. At block 302, VM 130 reads the interrupt time t1 scheduled by the hypervisor from the first memory location. In an example, VM 130 temporarily stores the interrupt time t1 (e.g., in a designated memory location).

At block 303, VM 130 compares time t2 to time t1. If t2 is less than t1, execution proceeds to block 304, otherwise execution continues at block 205.

At block 304, a VM exit to the hypervisor occurs. After block 304, execution of the method is completed.

At block 305, VM 130 stores t2 in the second memory location, and at block 306 VM 130 re-reads the first memory location. At block 307, VM compares the newly-read value of the first memory location to t1 that it previously stored. If it has changed from t1, execution proceeds to block 308, otherwise execution of the method is completed.

At block 308, variable t1 is set to the newly-read value of the first memory location. After block 308, execution continues back at block 303.

It should be noted that in some embodiments, some blocks of method 300 may be combined into a single atomic operation for greater efficiency. For example, in some implementations blocks 302, 303 and 305 may be performed atomically (e.g., by a single compare-and-swap instruction), and block 306 can then be omitted. As another example, in some implementations blocks 305, 306 and 307 may be performed atomically.

Figure 4:
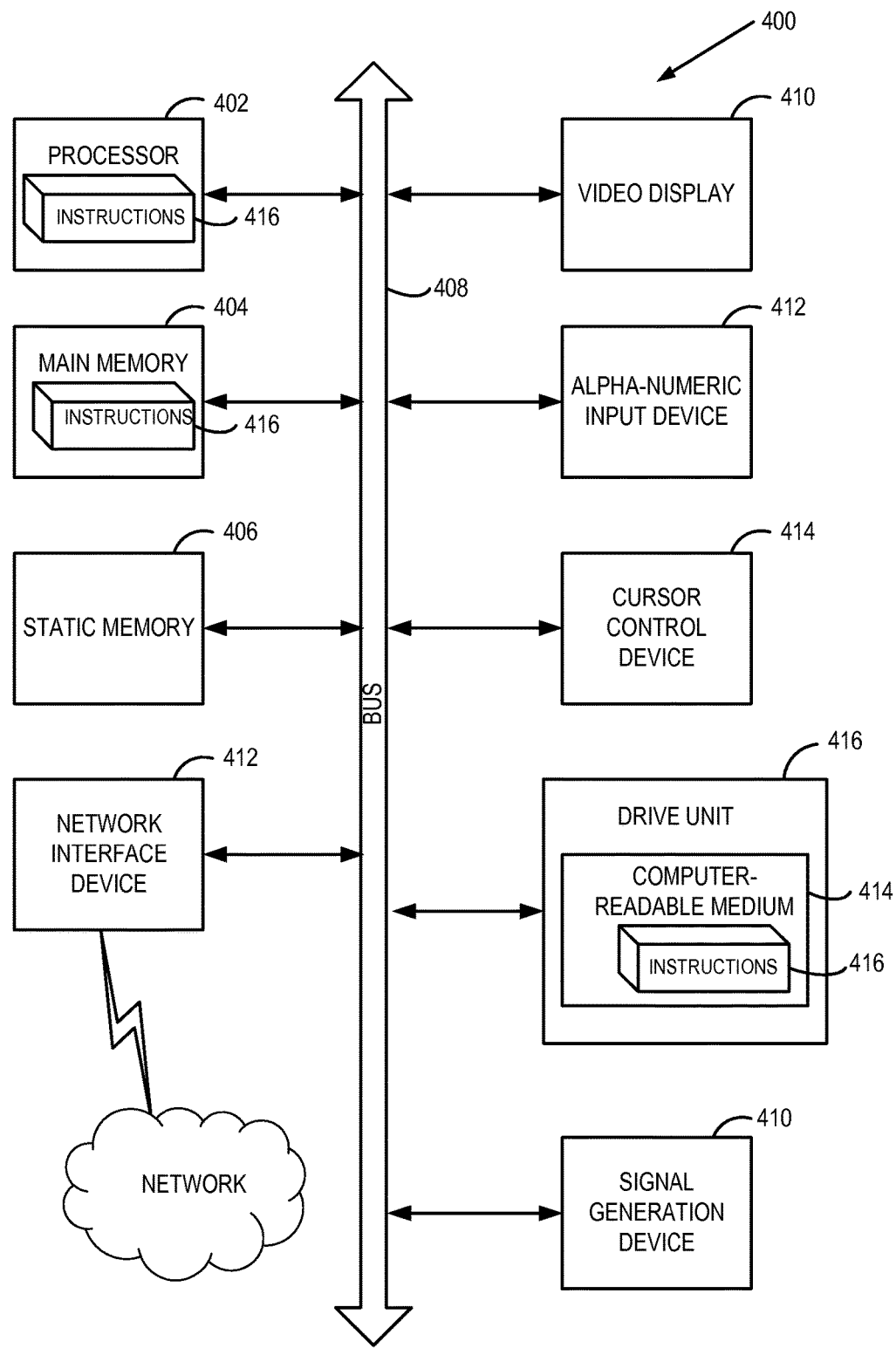
FIG. 4 depicts a block diagram of an illustrative computer system operating in accordance with embodiments of the disclosure.

FIG. 4 depicts an illustrative computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 406.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions 426 (e.g., instructions corresponding to the method of FIG. 2, etc.) embodying any one or more of the methodologies or functions described herein. Instructions 426 may also reside, completely or at least partially, within the main memory 404 and/or within the processor 402 during execution thereof by the computer system 400, the main memory 404 and the processor 402 also constituting computer-readable media. Instructions 426 may further be transmitted or received over a network via the network interface device 422.

While the computer-readable storage medium 424 is shown in an illustrative embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "executing", "reading", "storing", "detecting", "receiving", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    storing, by a hypervisor executed by a processing device of a physical host machine, in a first memory location that is readable by a virtual machine (VM), a first time that is associated with a first interrupt of the physical host machine;
    programming, by the hypervisor, a timer of the physical host machine to trigger the first interrupt of the virtual machine at the first time;
    receiving the first interrupt of the virtual machine at the first time, wherein the VM transfers execution control to the hypervisor at the first interrupt at the first time;
    subsequent to the storing and in response to the virtual machine transferring execution control to the hypervisor at the first time:
        detecting, by the hypervisor, a request by the VM for a second interrupt of the physical host machine at a second time, wherein the detecting comprises reading the second time from a second memory location that is writeable by the VM, the second time stored in the second memory location by the VM; and
        determining that the second time is greater than or equal to the first time; and
    in response to the determining that the second time is greater than or equal to the first time, programming, by the hypervisor, the timer of the physical host machine to trigger the second interrupt of the virtual machine at the second time.

2. The method of claim 1 wherein the detecting is in response to an exit to the hypervisor at the first time.

3. The method of claim 1 wherein the first time is read from the first memory location by the VM, and wherein in response to the second time being greater than or equal to the first time, the request is submitted by the VM by storing the second time in the second memory location.

4. The method of claim 1 further comprising detecting, by the hypervisor, a subsequent request by the VM for a third interrupt of the physical host machine at a third time, wherein the detecting comprises reading the third time from the second memory location, and wherein the second time is read from the first memory location by the VM, and wherein in response to the third time being before the second time, an exit to the hypervisor subsequently occurs.

5. The method of claim 1 wherein the VM reading from the first memory location and the VM storing into the second memory location are performed atomically.

6. The method of claim 1 wherein the first interrupt is requested by the VM.

7. The method of claim 1 wherein the first interrupt is requested by a different VM.

8. A physical host machine comprising:
    a timer;
    a memory comprising a first memory location that is readable by a virtual machine (VM) and a second memory location that is writeable by the VM; and
    a processing device, operatively coupled to the memory, to:
        store, via a hypervisor, in the first memory location, a first time that is associated with a first interrupt of the physical host machine;
        program, via the hypervisor, a timer of the physical host machine to trigger at the first time;
        receive the first interrupt of the virtual machine at the first time, wherein the VM transfers execution control to the hypervisor at the first interrupt at the first time;
        subsequent to the store and in response to the virtual machine transferring execution control to the hypervisor at the first time:
            detect, via the hypervisor, a request by the VM for a second interrupt of the physical host machine at a second time, wherein the detecting comprises reading the second time from the second memory location, the second time stored in the second memory location by the VM; and
            determine that the second time is greater than or equal to the first time; and
        in response to the determine that the second time is greater than or equal to the first time, program the timer of the physical host machine to trigger the second interrupt of the virtual machine at the second time.

9. The physical host machine of claim 8 wherein the detecting is in response to an exit to the hypervisor at the first time.

10. The physical host machine of claim 8 wherein the first time is read from the first memory location by the VM, and wherein in response to the second time being greater than or equal to the first time, the request is submitted by the VM by storing the second time in the second memory location.

11. The physical host machine of claim 8 wherein the processing device is further to detect, via the hypervisor, a subsequent request by the VM for a third interrupt of the physical host machine at a third time, wherein the detecting comprises reading the third time from the second memory location, and wherein the second time is read from the first memory location by the VM, and wherein in response to the third time being before the second time, an exit to the hypervisor subsequently occurs.

12. The physical host machine of claim 8 wherein the VM reading from the first memory location and the VM storing into the second memory location are performed atomically.

13. The physical host machine of claim 8 wherein the first interrupt is requested by the VM.

14. The physical host machine of claim 8 wherein the first interrupt is requested by a different VM.

15. A non-transitory computer readable storage medium, having instructions stored therein, which when executed, cause a processing device to:
- store, via a hypervisor executable by the processing device, in a first memory location that is readable by a virtual machine (VM), a first time that is associated with a first interrupt of a physical host machine;
- program, by the processing device via the hypervisor, a timer of the physical host machine to trigger at the first time;
- receive the first interrupt of the virtual machine at the first time, wherein the VM transfers execution control to the hypervisor at the first interrupt at the first time;
- subsequent to the store and in response to the virtual machine transferring execution control to the hypervisor at the first timer:
  - detect, by the processing device via the hypervisor, a request by the VM for a second interrupt of the physical host machine at a second time, wherein the detecting comprises reading the second time from a second memory location that is writeable by the VM, the second time stored in the second memory location by the VM; and
  - determine that the second time is greater than or equal to the first time; and
- program the timer of the physical host machine to trigger the second interrupt of the virtual machine at the second time.

16. The non-transitory computer readable storage medium of claim 15 wherein the detecting is in response to an exit to the hypervisor at the first time.

17. The non-transitory computer readable storage medium of claim 15 wherein the first time is read from the first memory location by the VM, and wherein in response to the second time being greater than or equal to the first time, the request is submitted by the VM by storing the second time in the second memory location.

18. The non-transitory computer readable storage medium of claim 15 wherein the instructions further cause the hypervisor to detect a subsequent request by the VM for a third interrupt of the physical host machine at a third time, wherein the detecting comprises reading the third time from the second memory location, and wherein the second time is read from the first memory location by the VM, and wherein in response to the third time being before the second time, an exit to the hypervisor subsequently occurs.

19. The non-transitory computer readable storage medium of claim 15 wherein the first interrupt is requested by the VM.

20. The non-transitory computer readable storage medium of claim 15 wherein the first interrupt is requested by a different VM.

* * * * *